Dec. 26, 1950     M. C. GRACE     2,535,849
EDUCATIONAL DEVICE
Filed May 28, 1946
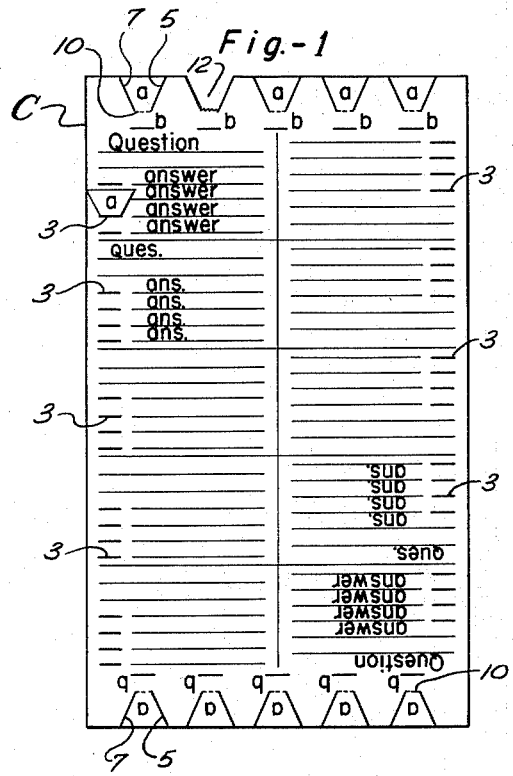
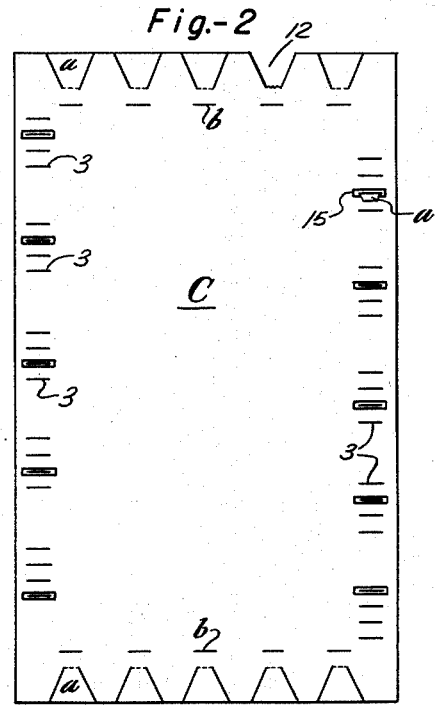
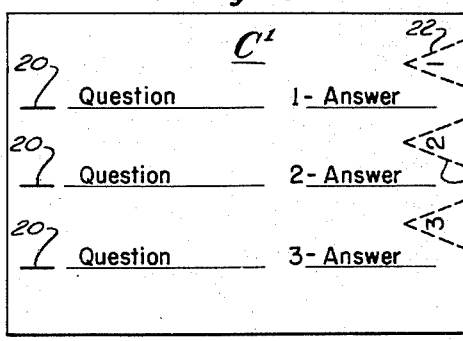
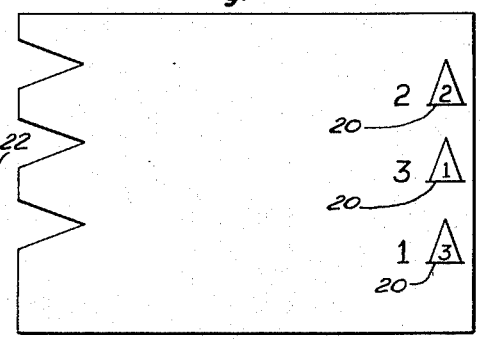
*INVENTOR.*
*Milton C. Grace*
BY
*Marm, Fenwick & Lawrence*
*Attorneys*

Patented Dec. 26, 1950

2,535,849

UNITED STATES PATENT OFFICE 2,535,849

EDUCATIONAL DEVICE

Milton C. Grace, New Orleans, La.

Application May 28, 1946, Serial No. 672,755

1 Claim. (Cl. 35—9)

This invention relates to educational devices, and more particularly to devices or games of the question and answer type.

It is an object of my invention to provide a convenient device for quizzing or testing the knowledge of individuals wherein the correct answers to certain prepared questions are indicated by novel means, the need for verbal or written answers being eliminated.

It is a further object of my invention to provide a quiz device of simple structure and well suited to mass production.

It is a further object of my invention to provide a quiz game, the operation of which may be quickly mastered and, in fact, is substantially obvious from mere examination of the device.

In accordance with the above objects, I provide in one form of my device a card of pasteboard or equivalent material, on the face of which a series of questions are printed. Associated with each question is printed a plurality of possible answers, only one of which is correct. Associated with each answer is a perforation or slot in the card adapted to receive therethrough a marker fashioned to be inserted therein. The markers are supplied as part of the card itself and are tearable therefrom by virtue of being perforatedly attached thereto. On the back of the card, the particular slots which are associated with the correct answers are visibly indicated by having rings printed therearound, or in any other suitable manner, so that after the contestant has placed markers in slots associated with what he selects as the correct answers to the several questions, the result may be checked by turning the card over and noting whether the markers are protruding through those slots indicated as being associated with the correct answers. In a modification of my invention, I provide markers carrying numerical notations printed thereon which correspond to numerically listed answers. A slot is associated with each question, there being the same number of slots as there are questions. On the back of the card a numeral corresponding to the numeral of the correct answer for a respective question is printed adjacent the associated slot. Questions are answered by removing the enumerated markers from the card by tearing along the perforated lines and selectively inserting them in the slots associated with the questions. Upon turning the card over, comparison is made between the numeral printed adjacent each slot and the numeral on the markers inserted in respective slots. Where the numerals are the same, the question has been correctly answered.

A more detailed description of my invention will now be given in conjunction with the appended drawings in which:

Figure 1 shows the face of a card prepared in accordance with my teaching;

Figure 2 shows the rear of the card shown in Figure 1;

Figure 3 represents the face of a card illustrating a modification of my invention; and Figure 4 shows the back of the card of Figure 3.

With reference to Figures 1 and 2, a card C is shown carrying a number of questions in spaced order as indicated by the notation "Question." Each question is associated with a plurality of possible answers, as indicated by the notation "Answer." The card is divided into two columns, one column being printed upside down as viewed in Figure 1 for a purpose to be hereinafter described. A small rectangular slot or perforation 3 which passes completely through the card is associated with each answer. A plurality of wedge-like markers a corresponding in number to the number of questions is provided. Each marker is formed from a material of the card and is readily removable therefrom by virtue of having its sides 5 and 7 cut entirely through the thickness of the card, whereby a perforated border 10 is the only remaining line of attachment between each marker and the card. To play the game, the markers are detached from the card and inserted in any slot 3 chosen by the player to indicate, in his judgment, the correct answer in each answer group. The wedge-like shape of the markers co-act with the slots to ensure a secure attachment, the markers being inserted to a predetermined extent, depending on design. The insertion of one such marker is indicated for the first question in the left-hand column of Figure 1, the empty space from which the particular marker was removed being indicated at 12. With reference to Figure 2, which shows the rear of the card, it will be seen that the marker has been inserted through a slot which is bordered by a printed indication such as a rectangle 15. It will be further noted that in each answer group there is one slot so indicated at the back of the card; and it will be understood that the printed indication in each case signifies the correct answer. Accordingly, for the example of insertion of the marker as shown in Figure 2, the correct answer has been chosen.

As the game progresses and an answer has been chosen in each group for the left-hand column of Figure 1, all the markers at the top edge of the card will have been exhausted. The card may now be turned upside down, whereupon a new column of questions is readably presented, as well as a new supply of markers. When all questions on the card have thus been answered, the rear of the card may be examined for purpose of keeping score and ascertaining mistakes.

The game may be played any number of times upon presentation to different persons, there being means provided by the series of slots b adjacent each row of markers a for storing the markers after they have been once removed from attachment to the card.

In the form shown in Figures 3 and 4, wherein Figure 3 represents the face of a card C' as initially presented to a player, a series of questions is printed as indicated by the notation "Question." Associated with each question is a slot 20 and an answer as indicated by the notation "Answer"; and it will be noted that the answers are consecutively numbered by numerals 1, 2, 3, etc. Portions of the card are perforated as indicated by the dash-line 22 so as to provide triangularly shaped markers removable therefrom, which markers are consecutively numbered by 1, 2, 3, etc., corresponding to the numerical notation of the answers. On the back of the card, adjacent each slot 20, as shown on Figure 4, is printed a number corresponding to the number of the correct answer associated with a respective question. In other words, the answer to the first question is answer Number 2, while the answers to the second and third questions are 3 and 1, respectively. In playing the game the markers 1, 2, and 3 are detached from the card C' and inserted in slots 20 associated with respective questions, due regard being had for the number printed on each marker so as to associate them with the numbers of the correct answers printed adjacent respective slots on the back of a card. Figure 4 illustrates a marker in each of the slots 20, wherein the second and third questions have been answered incorrectly.

I believe that many modifications of my teaching are possible. For example, the design, size and shape of the card and markers as well as the slots may be varied infinitely, as well as the mode of attachment of the markers, without departing from the spirit of my invention. For example, in Figure 1 ordinary paper clips at the edge of the card C adjacent to or encompassing selected answers could be substituted for my marker and slot arrangement. Further, the form shown in Figures 3 and 4 may be varied to provide more difficulty in ascertaining correct answers by having more answers and markers corresponding thereto than the number of questions printed on the card, so that the correct answers are intermingled with a number of incorrect answers, whereby pitfalls are artificially provided in a manner similar to the form shown on Figure 1.

Accordingly, my invention is not limited to the specific embodiments illustrated except as set forth in the appended claim.

Having thus described my invention, I claim:

In a device of the class described, a card having a plurality of inwardly directed marginal cuts on its edges defining pointed removable tabs, said card having on one face a plurality of questions and a plurality of selective answers associated with each question, each of said answers associated with a through slot in the card of a length to permit the insertion of a severed marginal tab and to frictionally engage and hold said tab substantially perpendicular to the plane of the card, with portions extending on both sides of the card, and indicia on the back face of the card associated with slots adjacent correct answers only, whereby answers selected on the face of the card by attachment of tabs through associated slots may be readily compared with the back of the card to ascertain the correctness of the selected answers.

MILTON C. GRACE.

REFERENCES CITED

The following references are of record in the file of this patent:

UNITED STATES PATENTS

| Number | Name | Date |
| --- | --- | --- |
| 411,952 | Clay | Oct. 1, 1889 |
| 1,405,063 | Murray | Jan. 31, 1922 |
| 1,656,030 | Waring | Jan. 10, 1928 |
| 1,868,823 | Goodrich | July 26, 1932 |
| 1,982,611 | Hartnett | Nov. 27, 1934 |
| 2,174,034 | Harkins | Sept. 26, 1939 |